Dec. 6, 1955 R. L. SARGISSON ET AL 2,726,292

DIAL MOUNTING

Filed Oct. 5, 1954 3 Sheets-Sheet 1

INVENTORS.
ROBERT L. SARGISSON
FREDRIC E. WOOD

BY *[signature]*

ATTY.

DIAL MOUNTING

Filed Oct. 5, 1954 3 Sheets-Sheet 2

*INVENTOR.*
ROBERT L. SARGISSON
FREDRIC E. WOOD
*BY* Mc Walter Owen
ATTY.

Dec. 6, 1955 R. L. SARGISSON ET AL 2,726,292

DIAL MOUNTING

Filed Oct. 5, 1954 3 Sheets-Sheet 3

INVENTOR.
ROBERT L. SARGISSON
FREDRIC E. WOOD
BY Mc Walter Owen.
ATTY.

United States Patent Office 2,726,292

Patented Dec. 6, 1955

2,726,292

DIAL MOUNTING

Robert L. Sargisson, Berwyn, and Fredric E. Wood, McHenry, Ill., assignors to Automatic Electric Laboratories, Inc., Chicago, Ill., a corporation of Delaware Application October 5, 1954, Serial No. 460,338

11 Claims. (Cl. 179—178)

This invention relates to telephone subsets in general and more specifically to the means for mounting a dial assembly of the finger wheel type in a telephone subset.

The primary object of the present invention is the provision of means whereby the dial assembly is non-rigidly supported on a mounting bracket fixed to the subset base plate so that the dial assembly is properly positioned and resiliently seated in engagement with the cover, or housing, of the subset in the dial opening provided in the housing, thereby providing a dust proof cover for the internal mechanism of the subset. A mounting arrangement of the above type enables quick and easy assembly of the housing on the base plate as well as ready accessibility for adjustments and repairs.

Other objects and features of the invention will be apparent from the following description of the drawings comprising Figs. 1 to 7 which show sufficient views of the mounting arrangement constructed in accordance with the invention to enable the invention to be described and understood.

The dial, or call transmitter mechanism, is of the finger wheel type substantially the same as the dial disclosed in the John E. Ostline Patent 2,410,520, issued November 5, 1946, except that an extended annular number plate encircling the dial is provided in place of the number plate shown in the Ostline patent.

Figure 1:
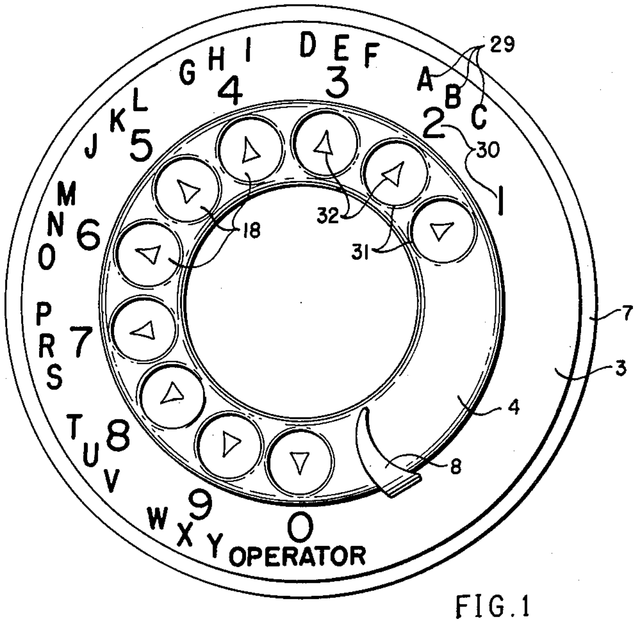
Fig. 1 shows the front view of the dial assembly comprising a dial and an extended number plate.

Fig. 1 shows the front face of the dial assembly including an annular number plate 3 having a periphery flange 7 along the periphery of the number plate 3. Numbers and letters such as 30 and 29, respectively, are arranged in concentric circles on the face of the number plate 3. The dial comprises a finger wheel 4 rotatably mounted on the circular dial casing 18, which is positioned within the number plate 3 by a novel eccentric positioning arrangement to be subsequently described. The finger wheel 4 has ten concentric finger holes 31 arranged on its face, and a finger stop 8 is mounted on the dial casing 18. Arrows 32 on the cover plate directly below each finger hole point in the direction of the number and letters, such as 30 and 29 respectively, which correspond to that particular finger hole.

Figures 2, 2A:
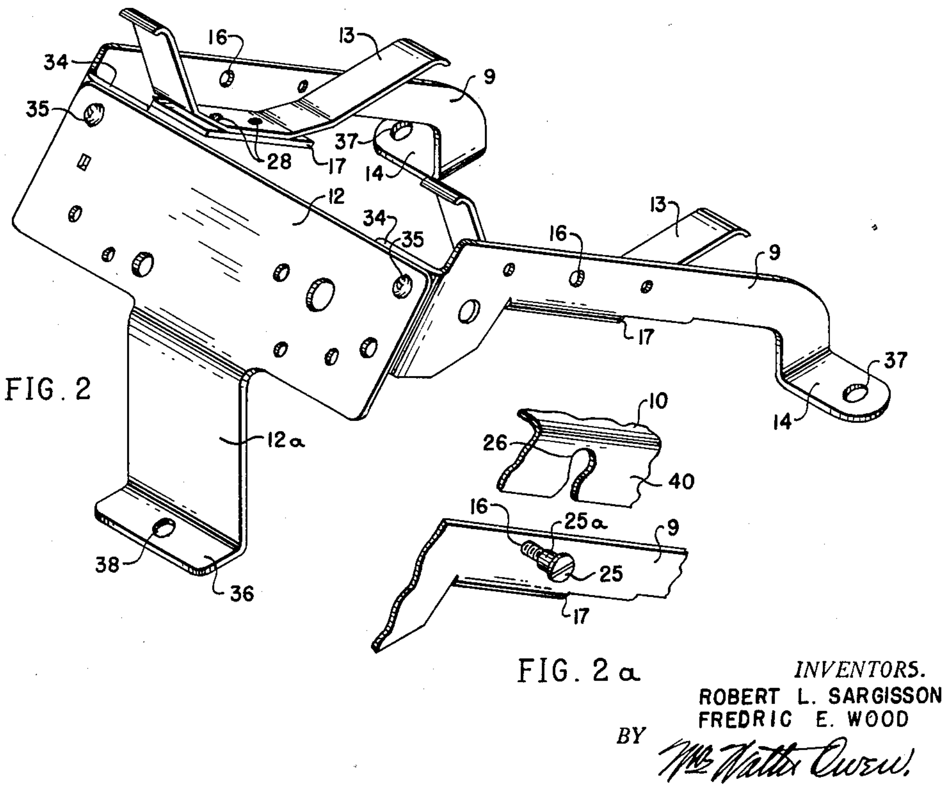
Fig. 2 shows a perspective view of the dial mounting bracket assembly.
Fig. 2A shows a cutaway portion of the dial mounting plate and a portion of the dial mounting bracket assembly with a special shoulder screw mounted therein.
Figure 7:
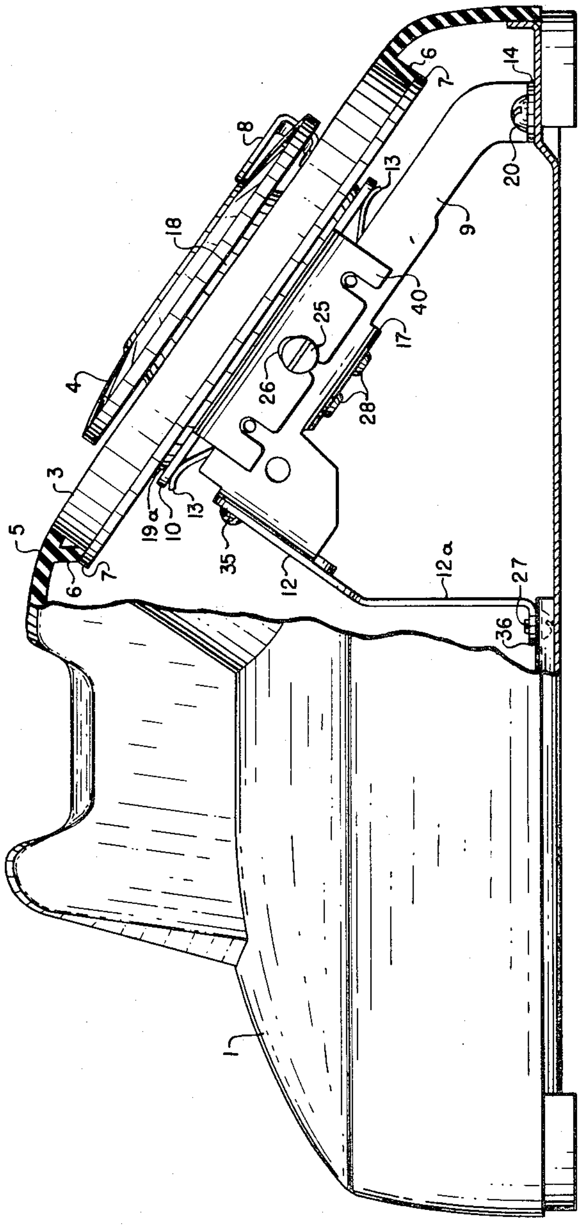
Fig. 7 shows the dial assembly mounted on the base of the telephone subset and positioned against the subset housing, part of which is shown in section.

Referring now to Fig. 2, the dial mounting bracket assembly comprises two mounting brackets 9 in the shape of legs connected to a bracket plate 12 at elbows 34 by means of the screws 35. The bracket plate 12 has a vertical center leg **12*a* supporting the mounting brackets 9 in the angular position shown. Mounting brackets 9 have horizontal projections 14, or ears, and mounting holes 37 at their lower ends. Holes 37 are for screws 20 for mounting the mounting brackets 9 to the base plate 2 as shown in Fig. 7. Likewise, bracket plate 12 has a leg projection 36 including a threaded hole 38 for screw 27 to mount the bracket plate 12 to the base plate 2 as shown in Fig. 7. Each mounting bracket 9 also includes a mounting bracket extension 17 turned inwardly at right angles to the main portion of bracket 9. Bow springs 13 are fastened to the extensions 17 by means of rivets 28. Plate mounting brackets 9 also have threaded holes 16** for a purpose to be described in the ensuing description.

Fig. 2A shows a perspective cutaway view of a portion of one of the mounting brackets 9 having a screw 25 partially screwed into a threaded hole 16. The screw 25 has a shoulder **25*a* slightly smaller than the screw head, and the threaded portion of the screw 25 has a slightly smaller diameter than the shoulder 25*a*. A cutaway portion of a dial mounting plate 10 is shown directly above screw 25. Dial plate 10 has a downwardly extending projection 40 having a slot 26 cut out in a shape of a key hole. The narrow portion of the key hole slot 26 is slightly wider than the diameter of the threaded portion of the screw 25, and the wide elongated portion of the key hole 26 is slightly wider than the diameter of the shoulder 25*a* of the screw 25**.

Figure 3:
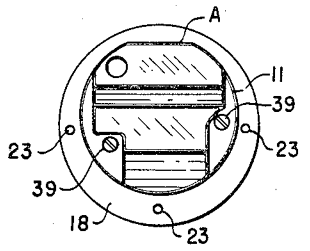
Fig. 3 shows a rear view of the dial casing.
Figure 4:
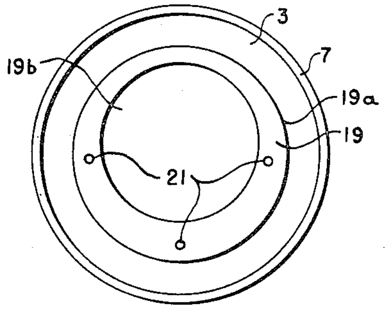
Fig. 4 shows a rear view of the annular number plate.
Figure 5:
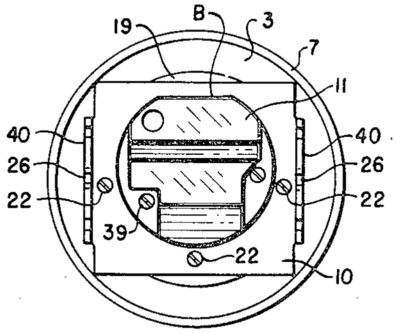
Fig. 5 shows a rear view of the dial and number plate assembled together on the mounting plate.
Figure 6:
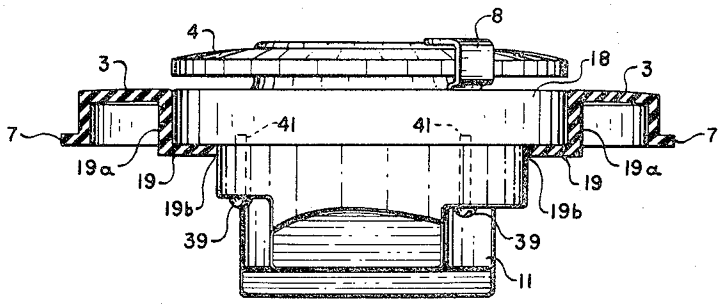
Fig. 6 shows a side view of the dial with its dust cover and the annular number plate in section.

Figs. 3, 4 and 5 show rear views of different parts of the dial assembly. Circular dial casing 18 (Fig. 3) has three threaded holes 23. A dust cover 11, covering the dialling equipment (not shown), is mounted eccentrically in comparison with the periphery of the dial casing 18 by means of two long screws 39 extending through the dust cover 11 and into threaded holes of the dial casing 18. Dial dust cover 11 is circular except for the chord surface A. The annular number plate 3 has a U-shaped cross section, as shown in Fig. 6, an outer annular periphery flange 7 about its periphery, and an inner eccentric flange 19 as shown in Fig. 4. Annular rim **19*a* is concentric with the outer periphery of the number plate 3 and flange 7, and an inner circular opening 19*b* of inner flange 19 is eccentric with the rim 19*a*, number plate 3 and flange 7. Rim 19*a* has a slightly larger circumference than the periphery of the dial casing 18, and inner opening 19*b* has a slightly larger circumference than the outer periphery of the dial dust cover 11. The dial casing 18 can only be placed on the inner flange 19 in a predetermined position due to the eccentric mounting of dust cover 11 on casing 18 and the eccentric opening 19*b* of flange 19. In this predetermined positioning of the casing 18 with the number plate 3, the holes 21 in flange 19 are approximately lined up with the threaded holes 23 in the casing, and the respective finger holes 31 of the finger wheel 4 are properly positioned with their corresponding indicia on the face of the number plate 3**.

A rectangular dial plate 10 (Fig. 5) has an opening corresponding to and slightly larger than the circumference of the dust cover 11. Screws 22 extend through holes in plate 10 and through holes 21 of flange 19 into threaded holes 23 of casing 18 for completing the dial assembly. Angular projections 40 on dial plate 10 are provided with key holes 26 for movably securing the dial assembly to the dial mounting bracket shown in Fig. 2.

Referring now to Fig. 6, there is shown a side view of the dial assembly with the number plate 3 shown in section. This view more clearly shows the contour lines of the dial dust cover 11 and the manner in which it is attached to the dial casing 18 by the long screws 39 screwed into threaded holes 41 of the dial casing 18. The cross section of annular number plate 3 is substantially U-shaped and comprises an outer flange 7 on the periphery of the number plate 3, an inner rim **19*a*** projecting downward from the face of the number plate 3, and an inner flange 19 at the lower edge of the rim 19*a* on which the casing 18 rests. Flange 19 has an opening 19*b* through which the dust cover 11 extends. The height of the dial casing 18 is substantially the same height as rim 19*a* from the face of the number plate 3 to the face of the flange 19. The periphery of the dial casing 18 is slightly smaller than the inner circumference of the rim 19*a*, and the dust cover 11 has a periphery slightly smaller than the circumference of the opening 19*b*, and thereby when the number plate 3 and the dial casing 18 are joined together as shown in the drawing, the face of the number plate 3 and the face of the dial casing 18 will be flush, and the rim 19*a* and the opening 19*b* will encircle dial casing 18 and dust cover 11 respectively.

Fig. 7 shows a cutaway portion of the housing 1 to show the manner in which the dial assembly is attached to the plate mounting bracket 9 and the manner in which the dial assembly is resiliently held in engagement with the housing 1 by the bow springs 13.

Having given a general description of the telephone subset a more detail description of the invention will now be given. The dial assembly comprising number plate 3, the dial 18 with its dust cover 11, and the dial plate 10 are first assembled as a unit. The dust cover 11 is first mounted on casing 18 by means of screws 19 being screwed into threaded holes 41 in casing 18 The casing 18, with its attached dust cover 11, is inserted into the concentric opening formed by the inner rim 19*a* of number plate 3 with the dust cover 11 extending through the eccentric opening 19*b* of the number plate. When the casing 18 is properly positioned within the number plate 3 the rear surface of casing 18 will be seated on flange 19. Since the dust cover 11 is eccentrically mounted on the circular casing 18 and the dust cover 11 protrudes through the eccentric circular opening 19*b* of the number plate 3, it is impossible to mount the dial casing 18 within the number plate 3 in any position other than approximately aligning the holes 21 of number plate 3 with the threaded holes 23 in casing 11. When mounted in this only possible manner the face of the number plate 3 and the face of the dial casing 18 will be flush, and the arrows, such as 32, on the cover plate of dial casing 18 directly below each finger hole will be pointing in the direction of the corresponding number and letters, such as 30 and 29 respectively, on the number plate 3 (Fig. 1).

The dial mounting plate 10 is now put over the protruding dust cover 11 with projections 40 facing upward as viewed in Fig. 5 and with the opening in plate 10 encircling the periphery of the dust cover 11. The dial mounting plate 10 has three holes in alignment with holes 21 of the number plate 3 and threaded holes 23 of the dial casing 18 through which the screws 22 extend for assembling the casing 18, the number plate 3, and mounting plate 10 as a completed dial assembly unit. As before mentioned, cover 11 has a chord surface A portion on the circumference of the cover 11, and likewise dial mounting plate 10 has an off centered circular hole having a similar chord surface B corresponding to the chord surface A of the cover 11. Due to the chord surfaces A and B it is impossible to mount the mounting plate 10 onto the periphery of the dust cover 11 except when the chord surfaces A and B are in complete alignment and only then can the mounting plate 10 be lowered over the periphery of the dust cover 11 (Fig. 5). When in this last mentioned position, the mounting plate 10 will engage both the rear surfaces of the flange 19 and the dial casing 18 (Fig. 7) whereby the screws 22 will be inserted through the three holes in the mounting plate 10, through the holes 21 of the number plate 3, and into the threaded holes 23 of the dial casing 18 and tightly screwed in. One of the projections 40 of plate 10 and its relative position with regard to its mounting bracket 9 is shown in Fig. 7.

The plate mounting brackets 9 are fastened to the base plate 2 by means of screws 20 through the holes 37 of the projections 14 and into threaded holes in the base plate 2. Bracket plate 12 is fastened to the base plate 2 by means of a screw 27 extending through a hole in base 2 and through the threaded hole 38 of the leg projection 36 of center leg 12*a* as shown in Fig. 7. The mounting brackets 9 and the bracket plate 12 are fastened together by screws 35 through the holes on the bracket plate 12 and through threaded holes on the bracket elbows 34 of the mounting brackets 9 (Figs. 2 and 7).

It will be remembered that the screws 25 contain shoulders 25*a* slightly smaller than the head of the screw 25, and that the diameter of the threaded portion is smaller than the shoulders 25*a* and that key hole slots 26 are cut out of the adjacent projections 40 of the dial mounting plate 10. The key hole slots have a wide elongated portion and a narrow portion. The diameter of the threaded portion of the screws 25 are smaller than the opening of the narrow portion of the key holes 26, and the wide elongated portion of the key holes 26 is wider than the diameter of shoulders 25*a*, and the diameter of the shoulders 25*a* are larger than the narrow opening of the key holes 26 (Fig. 2A).

The dial mounting plate 10 with the number plate 3 and the dial casing 18 secured thereto is lowered by way of the key holes 26 over the threaded portion of the screws 25 with the projections 40 overlapping the mounting brackets 9, as shown in Fig. 7. Plate 10 is lowered until the ends of the bow springs 13 make contact with mounting plate 10 and until the wide elongated portions of holes 26 are opposite the shoulders 25*a* of screws 25. At this point the screws 25 are tightened in place within the wide elongated portions until the shoulders 25*a* engage the mounting brackets 9. The shoulders 25*a* are slightly longer than the thickness of the mounting bracket projections 40 and therefore the head of the screws 25 permit a limited amount of movement of plate 10 dependent upon the length of the elongated holes 26 when the screws 25 are tightened. The tension of the bow springs 13 acting against the base plate 10 causing movement of the dial assembly until the shoulders 25*a* of the screws 25 engage the narrow portions of the key holes 26. The dial assembly is now movably and resiliently mounted on mounting brackets which are mounted on the base.

A telephone housing 1 is now lowered over the dial mounting assembly. The housing 1 has a circular dial opening therein for positioning the dial assembly. The housing 1 has a front surface portion 5 and a circular housing flange 6 below the front surface portion 5 upon which the periphery flange 7 of the number plate 3 is seated. The housing is now pressed down causing the housing flange 6 to engage the periphery flange 7 of the number plate 3, the flanges 6 and 7 being flush and causing the dial assembly to be pushed down against the tension of the bow springs 13. While the downward pressure is applied to the housing 1 the housing 1 is fastened to the base plate 2 in any well-known manner such as being screwed together. With the housing 1 fastened to the base plate 2 the shoulders 25*a* of screws 25 are somewhere within the wide elongated portions of the key holes 26 and the bow springs 13 resiliently act against the base plate 10 to hold the dial assembly flange 7 of the number plate 3 against the housing flange 6 causing the front surface portion 5 of the housing to be flush with the face of the number plate 3 (Fig. 7).

The reason for resiliently mounting the dial assembly by means of the bow springs 13 is to overcome manufacturing tolerances in the making of the housing and the inner parts of the subset. In mass production of these parts it is necessary to allow these parts to have slightly different dimensions, commonly referred to as tolerances, and therefore if certain of the parts are assembled with the maximum, or minimum tolerances, the overall height of the dial assembly mounted on its base would be too high to allow the housing to be secured to the base, or the height of the dial assembly would be too low to permit the flange 7 to properly seat on the housing flange 6. Another example might be that one of the bracket plate legs 12*a* was slightly smaller than its mate and therefore the dial assembly would tend to lean to that one side and the number plate 3 would not be flush with the front housing surface 5. However, due to the resiliency of the bow springs 13, these manufacturing tolerances are overcome to always enable the flange 7 to properly seat on flange 6 and to always position number plate 3 flush with the front housing surface 5.

While one embodiment of the invention has been disclosed, it will be understood that various modifications may be made therein which are within the true spirit and scope of the invention.

What is claimed is:

1. In a telephone subset, a base plate, a dial assembly comprising an impulse transmitting dial, an extended number plate encircling said dial, and a dial plate securing said dial to said number plate, a dial mounting bracket assembly comprising two front legs, a bracket plate secured to said two legs, and a center leg extending from said bracket plate, feet on said legs for securing said dial assembly to said base plate, a casing enclosing said dial assembly secured to said base plate, an opening in said casing for said dial assembly, positioning means on said casing adjacent said opening, means on said number plate cooperating with said positioning means for positioning said dial assembly in said opening, and a bow spring attached to each of said front legs adapted to engage said dial plate and resiliently hold said number plate means in engagement with said positioning means to position said dial assembly in said opening.

2. A telephone subset as claimed in claim 1 including elongated slots in said dial plate, and threaded studs extending through said slots and threaded into said two front legs for movably securing said dial assembly to said dial mounting bracket assembly.

3. A telephone subset comprising a base, a casing secured to said base, a dial mounting bracket secured to said base within said casing, a dial assembly, a circular dial opening in said casing accommodating said dial assembly, a circular flange on said casing forming said dial opening and extending inwardly from the outer surface of said casing, a circular flange on the periphery of said dial assembly, and spring means secured to said mounting bracket and adapted to engage and resiliently hold said dial assembly flange seated on said casing flange to position said dial assembly in said casing opening.

4. A telephone subset comprising a base, a casing secured to said base, a dial mounting bracket having a center leg and two side legs secured to said base within said casing, a unitary dial assembly comprising a dial, an extended number plate encircling said dial, and a dial mounting plate, a circular dial opening in said casing having a diameter slightly greater than the diameter of said number plate, a circular flange on said casing extending inwardly from the outer surface of said casing forming the other circumference of said dial opening, a flange on the periphery of said number plate having a diameter greater than the diameter of said casing flange, and spring means secured to said two side legs of said mounting bracket and adapted to engage said dial plate to forcibly hold said number plate flange seated on said casing flange to position said dial assembly in said dial opening of said casing.

5. A subset as claimed in claim 4 wherein said spring means comprises a pair of flat bow springs each secured to one of said side legs.

6. A telephone subset comprising a base, a casing secured to said base, a dial mounting bracket secured to said base within said casing, a dial assembly including a dial and an extended number plate encircling said dial, a circular dial opening in said casing encircling said number plate, a circular flange on said casing adjacent said opening, a circular flange on the periphery of said number plate, spring means secured to said mounting bracket and adapted to engage and resiliently hold said number plate flange in engagement with said casing flange to position said dial assembly in said dial opening of said casing, said casing flange extending inwardly from the front surface of said casing a predetermined distance and said number plate flange located on the periphery of said number plate in such a position that the front surface of said number plate and the front surface of said casing are flush.

7. A telephone subset comprising a base, a casing secured to said base, a dial mounting bracket secured to said base within said casing, a dial assembly, a circular dial opening in said casing encircling said dial assembly, a circular flange on said casing adjacent said opening, a circular flange on the periphery of said dial assembly, a dial mounting plate secured to said dial assembly, slots in said dial mounting plate and screws extending through said slots threaded into said mounted bracket movably securing said dial assembly to said mounting bracket, and spring means secured to said mounting bracket and adapted to engage said dial mounting plate and to forcibly hold said dial assembly flange in engagement with said casing flange to position said dial assembly in said dial opening of said casing.

8. A subset as claimed in claim 7 wherein said dial assembly flange and said casing flange are dimensioned to cause a portion of the front surface of the dial assembly to be flush with the front surface of said casing.

9. A telephone subset comprising a base, a casing, a dial mounting bracket secured to said base within said casing, a dial assembly, a circular dial opening in said casing encircling said dial assembly, a dial mounting plate secured to said dial assembly, key hole slots in said dial mounting plate and screws extending through said key hole slots and screwed into threaded holes in said mounting bracket, said key hole slots having a narrow and a wide portion thereon, said screws having shoulders positioned within said wide portions of said slots for movably securing said dial assembly to said mounting bracket, said wide portions of said key hole slots cooperating with said screw shoulders to permit limited movement of said dial assembly with respect to said dial mounting bracket, and spring means secured to said mounting bracket and adapted to engage said dial mounting plate and tensioned to forcibly hold said dial assembly in engagement with said casing to position said dial assembly in said dial opening of said casing.

10. A dial assembly of the finger wheel type comprising, a circular dial casing, a finger wheel having finger holes, means for rotatably mounting said finger wheel on the top of said casing, a substantially circular dust cover eccentrically attached to the bottom of said dial casing, an annular dial number plate concentrically encircling said dial casing, groups of indicia on the top surface of said number plate arranged concentrically outside of said finger wheel, and an inner flange on the bottom of said number plate having a circular opening eccentric with said number plate and concentrically cooperating with said dust cover to approximately and radially align the proper groups of indicia on said number plate with corresponding finger holes in said finger plate when said dial casing and its said dust cover is assembled within said annular number plate.

11. A dial assembly of the finger wheel type comprising, a circular dial casing, a finger wheel rotatably mounted on top of said dial casing, a circular dust cover eccentrically attached to the bottom of said dial casing, an annular dial number plate concentrically encircling said dial casing, and an inner flange on the bottom of said number plate having a circular opening eccentric with said number plate and concentrically cooperating with said dust cover to prevent improper assembly of said number plate with respect to said finger wheel.

No references cited.